United States Patent
Giesseler et al.

(10) Patent No.: US 12,528,704 B2
(45) Date of Patent: Jan. 20, 2026

(54) SILICA WITH REDUCED TRIBO-CHARGE FOR TONER APPLICATIONS

(71) Applicant: Evonik Operations GmbH, Essen (DE)

(72) Inventors: Mareike Giesseler, Maintal (DE); Frank Menzel, Hanau (DE); Alexander Lygin, Griesheim (DE); Rainer Golchert, Dieburg (DE)

(73) Assignee: Evonik Operations GmbH, Essen (DE)

( * ) Notice: Subject to any disclaimer, the term of this patent is extended or adjusted under 35 U.S.C. 154(b) by 858 days.

(21) Appl. No.: 17/667,727

(22) Filed: Feb. 9, 2022

(65) Prior Publication Data
US 2022/0267160 A1 Aug. 25, 2022

(30) Foreign Application Priority Data
Feb. 11, 2021 (EP) .................... 21156535

(51) Int. Cl.
*G03G 9/097* (2006.01)
*C01B 33/141* (2006.01)
*C09D 183/04* (2006.01)
*G03G 9/113* (2006.01)

(52) U.S. Cl.
CPC ........ *C01B 33/1417* (2013.01); *C09D 183/04* (2013.01); *G03G 9/1136* (2013.01); *C01P 2004/61* (2013.01); *C01P 2006/11* (2013.01); *C01P 2006/12* (2013.01); *C01P 2006/40* (2013.01)

(58) Field of Classification Search
CPC .......... G03G 9/09708; G03G 9/09716; G03G 9/09725
See application file for complete search history.

(56) References Cited

U.S. PATENT DOCUMENTS

| | | | |
|---|---|---|---|
| 4,048,290 A | 9/1977 | Lee | |
| 4,276,274 A | 6/1981 | Heckel | |
| 4,618,556 A | 10/1986 | Takenouchi | |
| 5,776,240 A | 7/1998 | Deller et al. | |
| 6,197,469 B1 | 3/2001 | Kerner et al. | |
| 6,303,256 B1 | 10/2001 | Kerner et al. | |
| 6,887,518 B2 | 5/2005 | Barthel et al. | |
| 2003/0190543 A1* | 10/2003 | Sugiura | G03G 9/09716 430/108.7 |
| 2010/0196815 A1 | 8/2010 | Schumacher et al. | |
| 2017/0168409 A1 | 6/2017 | Kaneeda et al. | |
| 2017/0198147 A1* | 7/2017 | Sasaki | C09C 1/30 |

FOREIGN PATENT DOCUMENTS

| | | | | |
|---|---|---|---|---|
| CN | 101 183 225 | | 5/2008 | |
| CN | 101 195 487 | | 6/2008 | |
| CN | 101 196 700 | | 6/2008 | |
| CN | 101 200 601 | | 6/2008 | |
| CN | 101 206 413 | | 6/2008 | |
| DE | 952 891 | | 11/1956 | |
| EP | 0 467 439 | | 1/1992 | |
| EP | 0 992 857 | | 4/2000 | |
| EP | 2145929 A1 * | 1/2010 | ............. B82Y 30/00 |
| EP | 2 676 930 | | 12/2013 | |
| JP | 2020142959 A * | 9/2020 | ........... G03G 9/0819 |
| WO | WO 2011/076518 | | 6/2011 | |

OTHER PUBLICATIONS

Translation of JP-2020142959-A.*
Translation of EP-2145929-A1.*
European Search Report and Search Opinion for corresponding EP 21 15 6535, filed Feb. 11, 2021.
Mathias, et al., "Basic characteristics and applications of aerosil: 30. The chemistry and physics of the aerosil surface," *Journal of Colloid and Interface Science* 125:61-68 (1988).
Aerosil® Fumed Silica; Technical Overiew; pp. 1-52; available online at www.aerosil.com.
Aerosil® Fumed Silica; Technical Overiew; pp. 53-104; available online at www.aerosil.com.

* cited by examiner

*Primary Examiner* — Peter L Vajda
(74) *Attorney, Agent, or Firm* — Law Office of Michael A. Sanzo, LLC

(57) ABSTRACT

Surface-treated fumed silica, with a tribo-electro static charge of −500 μC/g to +500 μC/g, a ratio of the tribo-electro static charge to BET surface area of −3.5 μC/m² to +3.5 μC/m², a methanol wettability of at least 20% by volume methanol in methanol/water mixture, a ratio of carbon content to BET surface area of at most 0.020 wt. %*g/m², a process for its preparation and the use thereof.

17 Claims, No Drawings

SILICA WITH REDUCED TRIBO-CHARGE FOR TONER APPLICATIONS

CROSS REFERENCE TO RELATED APPLICATIONS

The present application claims priority under 35 USC § 119 to European application EP 21156535, filed in Europe on Feb. 11, 2021, the contents of which is incorporated herein by reference in its entirety.

FIELD OF THE INVENTION

The present invention relates to a surface modified fumed silica with a reduced tribo-electrostatic charge, as well as the preparation method and the use thereof in toner.

BACKGROUND OF THE INVENTION

Toner may be used in image forming devices, such as printers, copiers and fax machines to form images upon a sheet of media. The image forming apparatus may transfer the toner from a reservoir to the media via a developer system utilizing differential charges generated between the toner particles and the various components in the developer system. Control of toner tribo-charge and flow properties may be achieved by dry toner surface modification and the attachment of fine particles on the surface of the toner particles. The tribo-charge of a toner particle can be controlled to a large extent by the right choice of external additives. Due to their high purity and very low water content, fumed silicas are excellent insulators i.e. have very high electrical resistance. Fumed silicas are therefore capable of building up and carrying high electrostatic charges when colliding with other particles. The term "tribo-charging" is usually used in toner technology as it refers to the generation of electrostatic charge through friction between surfaces. This property makes fumed silica very efficient in controlling and adjusting the charge characteristics of a toner in a well-defined manner. In essence, the toner surface takes on the characteristics of a fumed silica surface and charges accordingly.

DESCRIPTION OF THE PRIOR ART

Various surface modified fumed silica particles can be applied as additives in toner formulations. Selection of an appropriate silica additive is determined by the requirements of a particular toner application. One of the most important parameters determining the usability of silica in a toner is its tribo-electrostatic charge (also referred to simply as tribo-charge). Depending on the physico-chemical properties of fumed silica, including surface modification chemistry, particle surface area etc, a broad range of tribo-charge can be achieved. Thus, surface modified fumed silica AEROSIL® R 976 S with a BET surface area of 215-265 $m^2/g$ produced by Evonik Industries provides a tribo-charge of $-680$ $\mu C/g$, whereas another surface modified silica by the same manufacturer, AEROSIL® NA 200 Y (BET=100–150 $m^2/g$), provides a tribocharge of $+260$ $\mu C/g$. These and other typical fumed silicas suitable for use in toners are described in the product brochure "AEROSIL® Fumed Silica and AEROXIDE® Oxides for Toner Technical Information TI 1222" available online on www.aerosil.com.

Surface treated fumed silicas with a high negative charge are usually highly hydrophobic, whereas positively charged particles or particles with a reduced negative charge are often surface-modified with polar aminosilanes or quaternary trialkylammonium moieties, rendering such particles less hydrophobic or even hydrophilic. Thus, EP 0992857 A2 discloses in example 1 preparation of a highly hydrophobic silica powder with a tribo-charge of $-300$ $\mu C/g$ using (3-glycidyloxypropyl)trimethoxysilane as a surface treatment agent. Comparative example 1 of the same patent application shows preparation of a highly hydrophilic silica with a tribo-charge of $-150$ $\mu C/g$, surface treated with (3-glycidyloxypropyl)trimethoxysilane and 1,3-diaminopropane.

The electrification properties of toner compositions containing hydrophilic silicas having relatively high affinity to water, may be dependent on the environmental changes, such as varying humidity.

Both highly hydrophobic and hydrophilic surface-treated fumed silicas are usually characterized by a relatively high carbon content. Therefore, relatively high amounts of often expensive surface treatment agents are required.

Surface modified fumed silica particles with a reduced tribo-charge, are required for toner compositions with reduced electric charge. Such silica particles are often characterized by a relatively high ratio of tribo-charge relative to BET surface area. Thus, surface modified fumed silica AEROSIL® RX 50 (manufacturer: Evonik Industries) with a tribo-charge of $-200$ $\mu C/g$, a BET surface area of 25-45 $m^2/g$ (tribo-charge/average BET=$-5.7$ $\mu C/m^2$), and a carbon content of 0.5-1.0 wt %.

In other cases, the fumed silicas with a reduced tribo-charge, of e.g. from $-200$ $\mu C/g$ to $+200$ $\mu C/g$ show relatively high carbon contents related to the surface area. Thus, surface modified fumed silica AEROSIL® RY 50 (manufacturer: Evonik Industries) with a tribo-charge of $-110$ $\mu C/g$ has a BET surface area of 15-45 $m^2/g$ and a carbon content of 3.0-5.0 wt % (carbon content/average BET >0.100 wt %$\times g/m^2$). The fumed silica powder disclosed in example 2 of EP 0992857 A2 shows a tribo-charge of $+200$ $\mu C/g$, a BET surface area of 130 $m^2/g$ and a carbon content of 5.5 wt % (carbon content/BET=0.042 wt %$\times g/m^2$).

Problem and Solution

The technical problem addressed by the present invention is that of providing a fumed silica particularly suitable for use as an additive in toner compositions with relatively low surface charge.

The electrification properties of such toner compositions should not depend on environmental changes, such as humidity.

The amount of surface treatment agent required for producing such fumed silica powders should be minimized.

The present invention provides surface treated fumed silica, characterized by:
a tribo-electrostatic charge of $-500$ $\mu C/g$ to $+500$ $\mu C/g$;
a ratio of the tribo-electrostatic charge to BET surface area of $-3.5$ $\mu C/m^2$ to $+3.5$ $\mu C/m^2$;
a methanol wettability of at least 20% by volume methanol in methanol/water mixture;
a ratio of carbon content to BET surface area of at most 0.020 wt. %$\times g/m^2$.

Such fumed silica is particularly suitable for use as an additive in toner compositions with relatively low surface charge. The electrification properties of the resulting toner compositions are not dependent on environmental changes, such as humidity. The amount of surface treatment agent required for producing such fumed silica is relatively low, reducing the production costs for such silicas.

Silica

Silica of the present invention is preferably present in the form of particles, e.g. as a powder or granules. Most preferably, the inventive silica is a silica powder.

In the present invention, the term "granules" is understood to mean a grainy, readily pourable, free-flowing particulate solid material. The granules may be in the form of grainy particles with a spherical or any other shape, like pellets, rings etc, or irregularly formed fragments of a crushed granular material, e.g. with a statistical particle size distribution.

The term "powder" in the context of the present invention encompass fine particles.

The term "tribo-charge" used in the context of the present invention as equivalent to the term "tribo-electrostatic charge". This parameter is routinely used for assessing the electrostatic properties of different toner additives. The value of tribo-charge can be determined using a blow-off static electrometer, e.g. as described in paragraph [0118] of EP2676930A1.

The following procedure can be applied for measurement of a tribo-charge:

50 g of a non-coated ferrite carrier and 0.1 g of the fumed silica particles (coarse silica particles can be grounded or milled before measurement, if necessary) are put into a 75 mL glass container, covered with a cap, and mixed at the rotation speed of 90 rpm for five minutes using a TURBULA® mixer. Subsequently, 0.1 g of the thus prepared mixture is taken out and subjected to nitrogen blowing for 1 minute and measuring the tribo-charge by use of a blow-off static electrometer (TB-200 Model, manufacturer: Toshiba Chemical). The measurement is performed at a temperature of 25° C. and a relative humidity of 55%.

The inventive fumed silica has a tribo-electrostatic charge of −500 µC/g to +500 µC/g, preferably −400 µC/g to +400 µC/g, more preferably −300 µC/g to +300 µC/g, more preferably −250 µC/g to +250 µC/g, preferably −200 µC/g to +200 µC/g, more preferably −200 µC/g to +100 µC/g, more preferably −200 µC/g to +50 µC/g, more preferably −200 µC/g to 0 µC/g, more preferably −150 µC/g to 0 µC/g, more preferably −100 µC/g to 0 µC/g, more preferably −90 µC/g to 0 µC/g.

The relatively low tribo-electrostatic charge of the inventive silica allows the use thereof in toner compositions with relatively low surface charge.

The silica according to the invention can have a carbon content of from 0.05% to 10% by weight, preferably from 0.1% to 5.0% by weight, more preferably from 0.2% to 4.0% by weight, more preferably from 0.3% to 3.0% by weight, even more preferably from 0.4% to 2.5% by weight, still even more preferably from 0.5% to 2.0% by weight. The carbon content can be determined by elemental analysis according to EN ISO3262-20:2000 (Chapter 8). The analysed sample is weighed into a ceramic crucible, provided with combustion additives and heated in an induction furnace under an oxygen flow. The carbon present is oxidized to $CO_2$. The amount of $CO_2$ gas is quantified by infrared detectors. The stated carbon content of silica according to the invention refers to all carbon-containing components of the silica except for non-combustible compounds such as e.g. silicon carbide.

The silica of the invention can have a BET surface area of greater than 20 $m^2/g$, preferably of 30 $m^2/g$ to 500 $m^2/g$, more preferably of 50 $m^2/g$ to 400 $m^2/g$, more preferably of 70 $m^2/g$ to 300 $m^2/g$, most preferably of 80 $m^2/g$ to 200 $m^2/g$. The specific surface area, also referred to simply as BET surface area, can be determined according to DIN 9277:2014 by nitrogen adsorption in accordance with the Brunauer-Emmett-Teller method.

The silica according to the invention has a ratio of carbon content to BET surface area of at most 0.020 wt. %×$g/m^2$, more preferably at most 0.019 wt. %×$g/m^2$, more preferably at most 0.018 wt. %×$g/m^2$, more preferably at most 0.017 wt. %×$g/m^2$, more preferably at most 0.016 wt. %×$g/m^2$, more preferably 0.005 wt. %×$g/m^2$ to 0.015 wt. %×$g/m^2$. The term "wt. %" means in the context of the present invention "% by weight".

Thus, compared with the known silicas, the inventive silica is characterized by a relatively low ratio of the carbon content to BET surface area. Therefore, the desired, for e.g. toner applications silica properties can be achieved with lower amounts of surface treatment agents.

The ratio of the tribo-charge to BET surface area of the inventive silica is −3.5 $µC/m^2$ to +3.5 $µC/m^2$, preferably −3.0 $µC/m^2$ to +3.0 $µC/m^2$, more preferably −2.5 $µC/m^2$ to +2.5 $µC/m^2$, more preferably −2.3 $µC/m^2$ to +2.3 $µC/m^2$, preferably −2.3 $µC/m^2$ to +1.0 $µC/m^2$, more preferably −2.0 $µC/m^2$ to +1.0 $µC/m^2$, more preferably −1.5 $µC/m^2$ to +0.5 $µC/m^2$, more preferably −1.5 $µC/m^2$ to 0 $µC/m^2$.

Thus, the inventive silicas are characterized by the relatively low values of the tribo-electrostatic charge and simultaneously, relatively high BET surface areas, providing a very special combination of basic properties particularly useful for certain toner compositions.

The silica according to the present invention preferably has a numerical median particle size $d_{50}$ of less than 100 µm, more preferably less than 50 µm, more preferably less than 20 µm, more preferably less than 10 µm, more preferably from 0.05 µm to 10 µm, more preferably from 0.05 µm to 8 µm, more preferably from 0.05 µm to 5 µm, more preferably from 0.05 µm to 3 µm, more preferably from 0.05 µm to 2 µm, more preferably from 0.05 µm to 1.5 µm, more preferably from 0.1 µm to 1.0 µm, as determined by static light scattering method after 120 s of ultrasonic treatment at 25° C. of a 5% by weight dispersion of the silica in methanol.

The inventive silica preferably has particle size $d_{90}$ of not more than 200 µm, preferably not more than 150 µm, more preferably not more than 120 µm, more preferably not more than 100 µm, preferably not more than 80 µm, preferably not more than 50 µm, preferably not more than 30 µm, preferably not more than 20 µm, preferably not more than 10 µm, preferably not more than 5 µm, as determined by static light scattering (SLS) after 120 s of ultrasonic treatment at 25° C. of a 5% by weight dispersion of the silica in methanol.

The silica of the invention preferably has a relatively narrow particle size distribution, which can be characterized by a value of span $(d_{90}-d_{10})/d_{50}$ of particle size distribution of less than 3.0, preferably 0.4-3.0, more preferably 0.5-2.0, more preferably 0.6-1.8, more preferably 0.7-1.7, more preferably 0.8-1.6.

The above-mentioned particle sizes $d_{10}$, $d_{50}$ and $d_{90}$ refer to the particle size of the aggregated and agglomerated fumed silica particles. These values are determined by static light scattering method after 120 s of ultrasonic treatment at 25° C. of a 5% by weight dispersion of the silica in methanol. The values $d_{10}$, $d_{50}$ and $d_{90}$ reflect the particle size not exceeded by 10%, 50%, or 95% of all particles, respectively.

Tamped densities (also referred to as "tapped density") of various pulverulent or coarse-grain granular materials can be determined according to DIN ISO 787-11:1995 "General methods of test for pigments and extenders—Part 11: Determination of tamped volume and apparent density after tamping". This involves measuring the apparent density of a bed after agitation and tamping. The silica of the invention preferably has a tamped density of not more than 600 g/L, more preferably of not more than 500 g/L, more preferably of not more than 400 g/L, more preferably of not more than 300 g/L, more preferably of not more than 250 g/L, more preferably of 20 g/L to 200 g/L, more preferably of 30 g/L to 180 g/L, more preferably of 40 g/L to 150 g/L, more preferably of 50 g/L to 120 g/L.

Loss on drying (LOD) of the silica is preferably less than 2.0 wt %, more preferably less than 1.5 wt %, more preferably less than 1.0 wt %, more preferably less than 0.5 wt %, more preferably less than 0.4 wt %, more preferably less than 0.35 wt %, more preferably less than 0.3 wt %, more preferably less than 0.25 wt %, more preferably less than 0.2 wt %, more preferably less than 0.15 wt %, more preferably less than 0.1 wt %. Loss on drying can be determined according to ASTM D280-01 (method A). Thus, the inventive fumed silica usually contains relatively low amount of water, which makes it particularly useful in applications requiring low moisture contents.

The silica of the invention is a fumed (also known as "pyrogenic") silica. Fumed (pyrogenic) silicas are prepared by means of flame hydrolysis or flame oxidation. This involves oxidizing or hydrolysing of hydrolysable or oxidizable starting materials, generally in a hydrogen/oxygen flame. Starting materials used for pyrogenic methods include organic and inorganic substances. Silicon tetrachloride is particularly suitable. The hydrophilic silica thus obtained is amorphous. Fumed silicas are generally present in aggregated form. "Aggregated" is understood to mean that what are called primary particles, which are formed at first in the genesis, become firmly bonded to one another later in the reaction to form a three-dimensional network. The primary particles are substantially free of pores and have free hydroxyl groups on their surface. Such hydrophilic silicas can, as required, be hydrophobized, for example by treatment with reactive silanes.

The silicas of the invention can have an average primary particle size $d_{50}$ of 5 nm to 50 nm, preferably 5 nm to 40 nm. The average size of primary particles $d_{50}$ can be determined by transmission electron microscopy (TEM) analysis. At least 100 particles should be analysed to calculate a representative average value of $d_{50}$.

The silica of the invention may comprise an individual compound (silicon dioxide), a silica-based mixed oxide, a silica-based doped oxide, or a mixture thereof.

One example of fumed silicas is silica-based mixed oxides. It is known to produce such mixed oxides by simultaneously reacting at least two different metal sources in the form of volatile metal compounds, for example chlorides, in a $H_2/O_2$ flame. One example of such an oxide is the $SiO_2/Al_2O_3$ mixed oxide, which is produced by Evonik under the name Aerosil® MOX 170. When producing Aerosil® MOX 170, a mixture of $SiCl_4$ and $AlCl_3$ is directly hydrolyzed in a flame. Corresponding silanes, such as, for example, methyltrichlorosilane, trichlorosilanes, etc., may also be used as a raw material instead of or in addition to the chlorides, as described in DE-A 952 891, DE-A 25 33 925 and DE-A 27 02 896.

All components of thus prepared mixed oxides, for example silica and alumina in the afore mentioned case, are generally distributed homogeneously in the whole mixed oxide material as opposed to the other kinds of materials like mechanical mixtures of several metal oxides, doped metal oxides and suchlike. In the latter case, e.g. for the mixture of several metal oxides, separated domains of the corresponding pure oxides may be present, which determine the properties of such mixtures.

The silica of the invention comprises silicon dioxide as a major component. Preferably, the silica comprises at least 50%, more preferably at least 60%, more preferably at least 70%, more preferably 70%-99.9%, more preferably 80%-99.5%, more preferably 90%-99.0%, more preferably 92%-98.5%, more preferably 95%-98.0% by weight of silicon dioxide. Most preferably, the silica of the invention contains substantially no oxides other than silicon dioxide.

Surface Treatment Agent

In the present invention, the term "surface treated" relates to a chemical reaction of silica with the corresponding surface treatment agent, which by full or partial modification of free silanol groups of silica, modifies surface properties of silica.

Such surface treatment may impart hydrophilic or hydrophobic properties to the surface of the inventive silica. The terms "hydrophobized" or "hydrophobic" in the context of the present invention relate to the surface-treated particles having a low affinity for polar media such as water. The hydrophilic particles, by contrast, have a high affinity for polar media such as water. The hydrophobicity of the hydrophobic materials can typically be achieved by the application of appropriate nonpolar groups to the silica surface. The extent of the hydrophobicity of silica can be determined via parameters including its methanol wettability, as described in detail, for example, in WO2011/076518 A1, pages 5-6. In pure water, a hydrophobic silica separates completely from the water and floats on the surface thereof without being wetted with the solvent. In pure methanol, by contrast, a hydrophobic silica is distributed throughout the solvent volume; complete wetting takes place. For the determination of the methanol wettability, in each case 0.2 g (±0.005 g) of hydrophobic or hydrophobized particles are weighed into transparent centrifuge tubes. 8.0 ml portions of a methanol/water mixture with 10, 20, 30, 40, 50, 60, 70 or 80 vol. % methanol are added to each sample. The tubes are shaken for 30 seconds and then centrifuged at 2500 min$^{-1}$ for 5 minutes. The sediment volume is defined. The methanol wettability is defined as the volume percent of methanol for which the sediment volume is 100% (maximal possible for the tested silica sample). The higher the number the higher the hydrophobicity.

The silica of the present invention has a methanol wettability of at least 20% by volume, more preferably of 20% to 80% by volume, more preferably of 25% to 75% by volume, more preferably of 30% to 70% by volume, more preferably of 35% to 65% by volume, most preferably of 40% to 60% by volume methanol in a methanol/water mixture.

The inventive silica is preferably obtained using a surface treatment agent selected from the group consisting of organosilanes, silazanes, acyclic polysiloxanes, cyclic polysiloxanes, and mixtures thereof.

One type of preferred organosilanes is an alkyl organosilane of the general formula $$R'_x(RO)_ySi(C_nH_{2n+1}) \quad \text{(Ia) and}$$

$$R'_x(RO)_ySi(C_nH_{2n-1}) \quad \text{(Ib)}$$

wherein

R=alkyl, such as, for example, methyl-, ethyl-, n-propyl-, i-propyl-, butyl-

R'=alkyl or cycloalkyl, such as, for example, methyl, ethyl, n-propyl, i-propyl, butyl, cyclohexyl, octyl, hexadecyl.

n=1-20
x+y=3
x=0-2, and
y=1-3.

Among alkyl organosilanes of formula (Ia) and (Ib), particularly preferred are octyltrimethoxysilane, octyltriethoxysilane, hexadecyltrimethoxysilane, hexadecyltriethoxysilane.

Organosilanes used for surface treatment may contain halogens such as Cl or Br. Particularly preferred are the halogenated organosilanes of the following types:
organosilanes of the general formula $$X_3Si(C_nH_{2n+1}) \quad \text{(IIa) and}$$

$$X_3Si(C_nH_{2n-1}) \quad \text{(IIb),}$$

wherein X=Cl, Br, n=1-20;
organosilanes of the general formula $$X_2(R')Si(C_nH_{2n+1}) \quad \text{(IIIa) and}$$

$$X_2(R')Si(C_nH_{2n-1}) \quad \text{(IIIb),}$$

wherein X=Cl, Br
R'=alkyl, such as, for example, methyl, ethyl, n-propyl, i-propyl, butyl, cycloalkyl such as cyclohexyl
n=1-20;
organosilanes of the general formula $$X(R')_2Si(C_nH_{2n+1}) \quad \text{(IVa) and}$$

$$X(R')_2Si(C_nH_{2n-1}) \quad \text{(IVb),}$$

wherein X=Cl, Br
R'=alkyl, such as, for example, methyl, ethyl, n-propyl, i-propyl, butyl, cycloalkyl such as cyclohexyl
n=1-20

Among halogenated organosilanes of formula (II)-(IV), particularly preferred are dimethyldichlorosilane and chlorotrimethylsilane.

The used organosilanes can also contain other than alkyl or halogen substituents, e.g. fluorine substituents or some functional groups. Preferably used are functionalized organosilanes of the general formula $$(R'')_x(RO)_ySi(CH_2)_mR' \quad \text{(V),}$$

wherein
R''=alkyl, such as methyl, ethyl, propyl, or halogen such as Cl or Br,
R=alkyl, such as methyl, ethyl, propyl,
x+y=3
x=0-2,
y=1-3,
m=1-20,
R'=methyl-, aryl (for example, phenyl or substituted phenyl residues), heteroaryl —$C_4F_9$, $OCF_2$—CHF—$CF_3$, —$C_6F_{13}$, —O—$CF_2$—$CHF_2$, —$NH_2$, —$N_3$, —SCN, —CH=$CH_2$, —NH—$CH_2$—$CH_2$—$NH_2$, —N—($CH_2$—$CH_2$—$NH_2)_2$, —OOC($CH_3$)C=$CH_2$, —$OCH_2$—CH(O) $CH_2$, —NH—CO—N—CO—($CH_2)_5$, —NH—COO—$CH_3$, —NH—COO—$CH_2$—$CH_3$, —NH—($CH_2)_3Si(OR)_3$, —$S_x$—($CH_2)_3Si(OR)_3$, —SH, —$NR^1R^2R^3$ ($R^1$=alkyl, aryl; $R^2$=H, alkyl, aryl; $R^3$=H, alkyl, aryl, benzyl, $C_2H_4NR^4R^5$ with $R^4$=H, alkyl and $R^5$=H, alkyl).

Among functionalized organosilanes of formula (V), particularly preferred are 3-methacryloxypropyltrimethoxysilane, 3-methacryloxypropyltriethoxysilane, glycidyloxypropyltrimethoxysilane, glycidyloxypropyltriethoxysilane, aminopropyltriethoxysilane.

Silazanes of the general formula $R'R_2Si$—NH—$SiR_2R'$ (VI), wherein R=alkyl, such as methyl, ethyl, propyl; R'=alkyl, vinyl, are also suitable as a surface treatment agent. The most preferred silazane of formula (VI) is hexamethyldisilazane (HMDS).

Also suitable as surface treatment agents are cyclic polysiloxanes, such as octamethylcyclotetrasiloxane (D4), decamethylcyclopentasiloxane (D5), dodecamethylcyclohexasiloxane (D6), hexamethylcyclotrisiloxane (D6). Most preferably among cyclic polysiloxanes, D4 is used.

Another useful type of surface treatment agents is polysiloxanes or silicone oils of the general formula (VII):

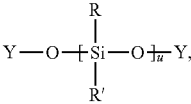

(VII)

wherein
Y=H, $CH_3$, $C_nH_{2n+1}$, wherein n=1-20, $Si(CH_3)_aX_b$, wherein a=2-3, b=0 or 1, a+b=3,
X=H, OH, $OCH_3$, $C_mH_{2m+1}$, wherein m=1-20.
R, R'=alkyl, such as $C_oH_{2o+1}$, wherein o=1 to 20, aryl, such as phenyl and substituted phenyl residues, heteroaryl, $(CH_2)_k$—$NH_2$, wherein k=1-10, H, u=2-1000, preferably u=3-100.

Most preferably among polysiloxanes and silicone oils of the formula (VII), polydimethylsiloxanes are used as surface treatment agents. Such polydimethylsiloxanes usually have a molar mass of 162 g/mol to 7500 g/mol, a density of 0.76 g/mL to 1.07 g/mL and viscosities of 0.6 mPa*s to 1 000 000 mPa*s.

Process for Producing the Silica

The present invention further provides a process for producing the inventive surface treated fumed silica, comprising the following steps:

a) subjecting surface untreated hydrophilic fumed silica with a BET surface area $s^1$ and a silanol density $d^2_{SiOH}$ to thermal treatment at a temperature of 300° C. to 1400° C. until the silanol group density $d^2_{SiOH}$ of the obtained thermally treated silica, is reduced by at least 5% of the $d^1_{SiOH}$ value and the BET surface area e of the obtained thermally treated silica is reduced by at most 30% of the $s^1$ value;

b) surface treatment of the thermally treated silica obtained in step a) with at least one surface treatment agent selected from the group consisting of organosilanes, silazanes, acyclic polysiloxanes, cyclic polysiloxanes, and mixtures thereof;

c) optionally crushing of silica obtained in step a) and/or in step b).

The above-mentioned surface untreated hydrophilic fumed silica employed in step a) of the inventive process is not surface treated, i.e. it is not modified with any surface treatment agent and is therefore hydrophilic in nature.

The terms "surface untreated hydrophilic silica" and "thermally treated silica" referred to in steps a) and b) of the inventive process are not limited to silica powders, but rather encompass silica powders, as well as other grainy particles or bodies with a spherical or any other shape, like pellets, rings etc, or irregularly-formed fragments of a crushed granular material, e.g. with a statistical particle size distribution.

Thus, prior to conducting step a) of the inventive process, the surface untreated hydrophilic silica can be densified to obtain a hydrophilic silica e.g. in the form of granules. Such densification can be effected, e.g. by deaeration or compaction, to give a silica with a tamped density of at least 80 g/L, preferably 80 g/L-2000 g/L, more preferably 90 g/L-1500 g/L, more preferably 90 g/L-800 g/L, more preferably 100 g/L-700 g/L, more preferably 110 g/L-600 g/L, more preferably 120 g/L-500 g/L.

Surface untreated hydrophilic silica employed in step a) of the inventive process can also be a powder which has not been subjected to densification.

In step a) of the process according to the invention, thermal treatment of the hydrophilic silica is conducted at a temperature 300° C. to 1400° C., preferably 350° C.-1300° C., more preferably 400° C.-1200° C., more preferably 400° C.-1100° C., more preferably 400° C.-1050° C., more preferably 400° C.-1000° C. The duration of step a) depends on the temperature applied and can generally be from 1 second to 20 hours, preferably from 1 minute to 10 hours, more preferably from 2 minutes to 8 hours, more preferably from 5 minutes to 5 hours, more preferably 10 minutes to 3 hours, more preferably 15 minutes to 2 hours.

Thermal treatment in step a) of the inventive process apparently leads to reducing the number of free silanol groups by condensation of such groups and formation of O—Si—O bridges. This process can also lead to reducing of the BET surface area. The extent of reducing the initial silanol group content of the hydrophilic silica and of the BET surface area thereof can be adjusted depending on the applied temperature and duration of this thermal treatment.

Step a) of the inventive process is conducted until the silanol density $d^2_{SiOH}$ of the obtained thermally treated silica is reduced by at least 5%, preferably by at least 7%, more preferably by at least 10%, more preferably by 10%-50%, more preferably by 10%-45% of the silanol density $d^1_{SiOH}$ of the silica employed in step a) of the process; and the BET surface area $s^2$ of the obtained thermally treated silica is reduced by at most 30%, preferably by at most 25%, more preferably by at most 20%, more preferably by at most 15%, more preferably by 1%-10% of the BET surface area $s^1$ of the silica employed in step a) of the process.

The silanol density $d_{SiOH}$ is the number of silanol groups relative to BET surface area, expressed in SiOH-groups/nm$^2$. This parameter can be determined by the method including the reaction of the silica with lithium aluminium hydride, e.g. as described in detail on page 8, line 17 thru page 9, line 12 of EP 0725037 A1. This method is also described in detail in Journal of Colloid and Interface Science, vol. 125, no. 1, (1988), pp. 61-68.

The silanol (SiOH) groups of the dried silica sample are reacted with lithium aluminium hydride (LiAlH$_4$), the quantity of gaseous hydrogen formed during this reaction and thus the amount of silanol groups in the sample $n_{OH}$ (in mmol SiOH/g) is determined. Using the corresponding BET surface area (in m$^2$/g) of the tested material, the silanol group content in mmol OH/g can easily be converted in number $d_{SiOH}$ of silanol groups relative to BET surface area:

$$d_{OH}[\text{SiOH/nm}^2] = (n_{OH}[\text{mmol SiOH/g}] \times N_A)/(BET [\text{m}^2/\text{g}] \times 10^{21}),$$

wherein $N_A$ is Avogadro number (~6.022*10$^{23}$)

The surface untreated fumed silica employed in the inventive process usually has a number of silanol groups relative to BET surface area $d^1_{SiOH}$ of at least 1.40 SiOH/nm$^2$, preferably 1.40 SiOH/nm$^2$-3.00 SiOH/nm$^2$, more preferably 1.50 SiOH/nm$^2$-2.80 SiOH/nm$^2$.

The surface untreated fumed silica employed in the inventive process can have a BET surface area of greater than 20 m$^2$/g, preferably of 30 m$^2$/g to 500 m$^2$/g, more preferably of 50 m$^2$/g to 400 m$^2$/g, more preferably of 70 m$^2$/g to 350 m$^2$/g, most preferably of 80 m$^2$/g to 300 m$^2$/g. The specific surface area, also referred to simply as BET surface area, can be determined according to DIN 9277:2014 by nitrogen adsorption in accordance with the Brunauer-Emmett-Teller method.

During the thermal treatment in step a) of the inventive process, the employed silica is usually densified. The tamped density of the silica thermally treated in step a) of the inventive process is preferably by at least 5%, more preferably by at least 10%, more preferably by at least 20% higher, than the tamped density of the silica employed in this step.

Step a) of the inventive process is preferably carried out while the silica in motion, preferably in constant motion during the process, i.e. silica is being moved during the thermal treatment. Such a "dynamic" process is an opposite of a "static" thermal treatment process, wherein silica particles are not moved, e.g. are present in layers during a thermal treatment e.g. in a muffle furnace.

It has been surprisingly found that such a dynamic thermal treatment process using surface untreated hydrophilic silica powder in step a) in combination with suitable temperature and duration of the thermal treatment allows producing of small particles with a narrow particle size distribution particularly suitable for use in toner compositions. In contrast, a "static" thermal treatment without any movement during the thermal treatment step leads to sintered aggregates with much larger particle size and broader particle size distribution.

Step a) of the inventive process can be carried out in any suitable apparatus, allowing keeping the silica powder at the above-specified temperature for a specified period of time, preferably while moving the silica. Some suitable apparatuses are fluidized bed reactors and rotary kilns. Rotary kilns, particularly those with a diameter of 1 cm to 2 m, preferably 5 cm to 1 m, more preferably 10 cm to 50 cm, are preferably used in step a) of the inventive process.

The silica is preferably being moved at the motion rate of a least 1 cm/min, more preferably at least 10 cm/min, more preferably at least 25 cm/min, more preferably at least 50 cm/min. Preferably, the silica is being moved at this motion rate for the whole duration of the thermal treatment step a). The motion rate in a rotary kiln corresponds to the circumferential speed of this reactor type. The motion rate in a fluidized bed reactor corresponds to the carrier gas flow rate (fluidization velocity).

It is further preferable, that essentially no water is added before, during or after carrying out step a) of the inventive process. In this way, the additional evaporation of the absorbed water is avoided and thermally treated silica with a lower water content may be obtained.

The thermal treatment step a) can be conducted under flow of a gas, such as, for example, air or nitrogen, the gas preferably being essentially free of water or pre-dried.

"Essentially free of water" means with respect to the gas that the humidity of the gas does not exceed its humidity under the employed conditions such as the temperature and the pressure, i.e. no steam or water vapour is added to the gas prior to use. Water content of the gas used in step a) of the inventive process, is preferably less than 5% by volume, more preferably less than 3% by volume, more preferably less than 1% by volume, more preferably less than 0.5% by volume.

Step b) of the process according to the invention can be carried out at a temperature of 10° C. to 250° C. for 1 minute to 24 hours. The time and the duration of step b) can be selected according to the specific requirements for the process and/or targeted silica properties. Thus, the lower treatment temperature usually requires the longer hydrophobization times. In one preferred embodiment of the invention, hydrophobizing of the surface untreated hydrophilic silica is performed at 10 to 80° C. for 3 to 24 hours, preferably for 5 to 24 hours. In another preferred embodiment of the invention, step b) of the process is carried out at 90 to 200° C., preferably at 100 to 180° C., most preferably at 120 to 160° C. for 0.5 to 10 hours, preferably for 1 to 8 hours. Step b) of the process according to the invention can be carried out under the pressure of 0.1 to 10 bar, preferably under 0.5 to 8 bar, more preferably at 1 to 7 bar, most preferably under 1.1 to 5 bar. Most preferably, step b) is performed in a closed system under natural vapour pressure of the used surface treatment agent at the reaction temperature.

Step b) of the inventive process can be conducted in the presence of water.

The molar ratio of water to the surface treatment agent in step b) of the inventive process is preferably from 0.1 to 100, more preferably 0.5 to 50, more preferably 1.0 to 10, more preferably 1.2 to 9, more preferably 1.5 to 8, more preferably 2 to 7.

However, if a surface treated silica with a particularly low water content should be obtained, essentially no water should preferably be added before, during or after conducting step b) of the inventive process.

The surface treatment agent and/or water are preferably used in liquid form in the inventive process.

In step b) of the inventive process, the silica subjected to thermal treatment in step a) is preferably sprayed with a liquid surface treatment agent and optionally with water, in any sequence, at ambient temperature (about 25° C.) and the mixture is subsequently treated thermally at a temperature of 50° C. to 400° C. over a period of 1 to 6 hours.

An alternative method for surface treatment in step b) can be carried out by treating the silica subjected to thermal treatment in step a) first with water and then with a surface treatment agent, or first with a surface treatment agent and then with water, or with a mixture of water and with a surface treatment agent, with water and/or a surface treatment agent being in the vapour form and subsequently treating the mixture thermally at a temperature of 50° C. to 800° C. over a period of 0.5 to 6 hours.

Yet another possible surface treatment method includes adding a suitable surface treatment agent to the dispersion, e.g. a water-containing dispersion, comprising the thermally treated silica. The mixture can be heated while stirring, and the surface treated product can be than separated by filtration.

The thermal treatment after the surface treatment in step b) can be conducted under protective gas, such as, for example, nitrogen. The surface treatment can be carried out in heatable mixers and dryers with spraying devices, either continuously or batchwise. Suitable devices can be, for example, ploughshare mixers or plate, cyclone, or fluidized bed dryers.

The amount of the surface treatment agent used depends on the type of the particles and of the surface treatment agent applied. However, usually from 1% to 25%, preferably 2%-20%, more preferably 5%-18%, by weight of the surface treatment agent related to the amount of the silica subjected to thermal treatment in step a), is employed.

The amount of optionally used water also depends on the type of the particles and of the surface treatment agent applied. However, usually from 0.5% to 15%, preferably 1%-12%, more preferably 2%-10%, by weight of water related to the amount of the silica subjected to thermal treatment in step a), is employed.

The required amount of the surface treatment agent and optionally of the water can depend on the BET surface area of the surface untreated hydrophilic silica employed. Thus, preferably, 0.1 µmol-100 µmol, more preferably 1 µmol-50 µmol, more preferably 3.0 µmol -20 µmol of silicon atoms in the surface treatment agent and 0.1 µmol-500 µmol, more preferably 1 µmol-100 µmol, more preferably 10 µmol-50 µmol of water per $m^2$ of the BET specific surface area of the surface untreated hydrophilic silica subjected to thermal treatment in step a), is employed.

In optional step c) of the inventive process, silica subjected to thermal treatment in step a) and/or surface treated silica obtained in step b) are crushed. Thus, particularly if densified bodies or coarse particles are used or obtained in step a) and/or b), those can be crushed in one or two subsequent steps c) to obtain silica powder.

Crushing in optional step c) of the inventive process can be realized by means of any suitable for this purpose machine, e.g. by a mill.

If silica powders are both used and obtained in both steps a) and b), no crushing is necessary. Still, the obtained in this case silicas can be crushed further, e.g. milled to obtain even smaller silica particles.

Composition Comprising the Silica

Another subject-matter of the present invention is composition, especially toner composition, comprising the silica of the invention.

The composition according to the invention can comprise at least one binder, which joins the individual parts of the composition to one another and optionally to one or more fillers and/or other additives and can thus improve the mechanical properties of the composition. Such a binder can contain organic or inorganic substances. The binder optionally contains reactive organic substances. Organic binders can, for example, be selected from the group consisting of (meth)acrylates, alkyd resins, epoxy resins, gum Arabic, casein, vegetable oils, polyurethanes, silicone resins, wax, cellulose glue and mixtures thereof. Such organic substances can lead to the curing of the composition used, for example by evaporation of the solvents, polymerization, crosslinking reaction or another type of physical or chemical transformation. Such curing can take place, for example, thermally or under the action of UV radiation or other radiation. Both single (one) component (1-C) and multicomponent systems, particularly two component systems (2-C) can be applied as binder. Particularly preferred for the present invention are water based or miscible with water (meth)acrylate-based binders and epoxy resins (preferably as two-component systems).

In addition to the organic binder or as an alternative thereto, the composition of the invention can contain inorganic curable substances. Such inorganic binders, also referred to as mineral binders, have essentially the same task as the organic binders, that of joining additive substances to one another. Furthermore, inorganic binders are divided into non-hydraulic binders and hydraulic binders. Non-hydraulic binders are water-soluble binders such as calcium lime, Dolomitic lime, gypsum and anhydrite, which only cure in air. Hydraulic binders are binders which cure in air and in the presence of water and are water-insoluble after the curing. They include hydraulic limes, cements, and masonry cements. The mixtures of different inorganic binders can also be used in the composition of the present invention.

Apart from the silica and the binder, the composition according to the invention can additionally contain at least one solvent and/or filler and/or other additives.

The solvent used in the composition of the invention can be selected from the group consisting of water, alcohols, aliphatic and aromatic hydrocarbons, ethers, esters, aldehydes, ketones and the mixtures thereof. For example, the solvent used can be water, methanol, ethanol, propanol, butanol, pentane, hexane, benzene, toluene, xylene, diethyl ether, methyl tert-butyl ether, ethyl acetate, and acetone. Particularly preferably, the solvents have a boiling point of less than 300° C., particularly preferably less than 200° C. Such relatively volatile solvents can be easily evaporated or vaporized during the curing of the composition according to the invention.

Use of the Silica

The inventive silica can be used as a constituent of paints or coatings, silicones, pharmaceutical or cosmetic preparations, adhesives or sealants, toner compositions, as well as for modifying rheology properties of liquid systems, as anti-settling agent, for improving flowability of powders, and for improving mechanical or optical properties of silicone compositions.

The silica of the invention is particularly suitable for use in toner compositions.

The invention further provides toner composition comprising the inventive silica.

Such toner compositions usually comprise toner particles having an average size in the range of 1 µm-25 µm. The inventive fumed silica can be present in the range of 0.01% by weight to 2.0% by weight of the toner composition.

EXAMPLES

Analytical Methods

Tribo-Charge [in pC/g]

50 g of a non-coated ferrite carrier and 0.1 g of the fumed silica were put into a 75-mL glass container, covered with a cap, and shaken for five minutes using a TURBULA® mixer. Subsequently, 0.1 g of the thus prepared mixture was taken out and subjected to nitrogen blowing for 1 minute and measuring the tribo-charge by use of a blow-off static electrometer (TB-200 Model from Toshiba Chemical). The measurement was performed at a temperature of 25° C. and a relative humidity of 55%.

Methanol wettability [in vol % of methanol in methanol/water mixture] was determined according to the method described in detail, in WO2011/076518 A1, pages 5-6.

Carbon content [in wt. %] was determined by elemental analysis according to EN ISO3262-20:2000 (Chapter 8). The analysed sample was weighed into a ceramic crucible, provided with combustion additives and heated in an induction furnace under an oxygen flow. The carbon present is oxidized to $CO_2$. The amount of $CO_2$ gas is quantified by infrared detectors.

The number of silanol groups relative to BET surface area $d_{SiOH}$ [silanol density, in $SiOH/nm^2$] was determined by reaction of the pre-dried samples of silicas with lithium aluminium hydride solution as described in detail on page 8, line 17 thru page 9, line 12 of EP 0725037 A1.

Loss on drying (LOD, in wt. %) was determined according to ASTM D280-01 (method A).

Specific BET surface area [$m^2/g$] was determined according to DIN 9277:2014 by nitrogen adsorption in accordance with the Brunauer-Emmett-Teller method.

Preparation of Silicas

Examples 1-3

Thermal Treatment

Fumed silica powder AEROSIL® 90 (BET=90 $m^2/g$, manufacturer: Evonik Resource Efficiency GmbH) was compressed in a roller compactor with a press force of 2 kN/cm. The thus obtained compressed rods were crushed in a screen granulator, and the resulting crushed fragments with a tamped density of about 320 g/L were subjected to thermal treatment in a rotary kiln at 400° C. (example 1), 700° C. (example 2), or 1000° C. (example 3). The mean residence time of the silica in the rotary kiln was in the range 30-60 minutes.

The obtained coarse particles were milled to obtain powders, which were used for subsequent hydrophobization.

Surface Treatment

Hydrophilic silica powder after thermal treatment step (100 g) was put in a reactor. Water (1.0 g) was added at continuous stirring at 25° C. followed by spraying hexamethyldisilazane (HMDS) (10 g) on the silica. The stirring was continued for 120 minutes at 200° C. under the nitrogen gas atmosphere. After this time, the silica powder was put into a drying pan and dried in a thin layer of up to 1 cm thickness in the nitrogen atmosphere at 120° C. in an oven for 3 h to evaporate all the volatiles.

Physico-chemical properties of the hydrophilic silica after thermal treatment are shown in Table 1. Physico-chemical properties of the corresponding surface treated silica powders are summarized in Table 2 and compared with the commercially available products Aerosil® NX 90 G and Aerosil® NX 90 S, both prepared using the hydrophilic Aerosil® 90 as a precursor and surface treated with HMDS (data based on the product brochure "AEROSIL® Fumed Silica and AEROXIDE® Oxides for Toner Technical Information TI 1222" available online on www.aerosil.com).

From Table 1 it can be seen, that thermal treatment of silica with a BET surface area of 90 $m^2/g$ at 400-1000° C. for 30-60 minutes led to reducing of the silanol group content $d_{SiOH}$ by as much as ca. 11-42% while reducing of the BET surface area by only ca. 4-6% as compared to the non-thermally treated starting material (Aerosil® 90).

It can be seen from Table 2, that thermally treated and hydrophobized with HMDS samples (examples 1-3) provided the materials with tribo-charges in the range −20 . . . −70 uC/g compared with a tribo-charge of about −300 uC/g for the corresponding non-thermally treated and hydrophobized samples (Aerosil® NX 90 G and Aerosil® NX 90 S). Consequently, the ratio of the tribo-charge to BET surface area of the obtained silica materials was with 0.25-0.96 much lower than reported for similar material known from the prior art, e.g. Aerosil® NX 90 G and Aerosil® NX 90 S, see Table 2.

TABLE 1

Physico-chemical properties of the hydrophilic silica after thermal treatment.

| Example | Thermal treatment, [° C.] | $d_{SiOH}$ [$SiOH/nm^2$] | reducing of $d_{SiOH}$ comparing to AE 90, [%] | BET, [$m^2/g$] | reducing of BET compared to AE 90, [%] |
|---|---|---|---|---|---|
| AEROSIL ® 90 (AE 90) | — | 2.18 | 0 | 90 | 0 |
| Example 1 | 400 | 1.95 | 10.6 | 86 | 4.4 |
| Example 2 | 700 | 1.53 | 29.8 | 87 | 3.3 |
| Example 3 | 1000 | 1.27 | 41.7 | 85 | 5.6 |

TABLE 2

Physico-chemical properties of the surface treated silica powders.

| Example | LOD, [wt. %] | BET, $m^2$g | methanol wettability, [vol. %] | C-content, [wt. %] | Tribo-charge, [μC/g] | C-content/ BET, [wt. % × g/$m^2$] | Tribo-charge/ BET, [uC/$m^2$] |
|---|---|---|---|---|---|---|---|
| Aerosil ® 90G | <0.5 | 50-80 | >40 | 0.7-1.5 | −310 | | −3.9 . . . −6.2 |
| Aerosil ® 90S | <0.5 | 50-80 | >40 | 0.5-1.5 | −300 | | −3.8 . . . −6.0 |
| Example 1 | 0.29 | 73 | 58 | 0.88 | −70 | 0.012 | −0.96 |
| Example 2 | 0.09 | 77 | 51 | 0.78 | −30 | 0.010 | −0.39 |
| Example 3 | 0.05 | 80 | 44 | 0.61 | −20 | 0.008 | −0.25 |

The invention claimed is:

1. Surface treated fumed (pyrogenic) silica, comprising:
an average primary particle size, d50, of 5 nm to 30 nm;
a numerical median particle size, d50, of less than 10 μm;
a tribo-electrostatic charge of −500 μC/g to +500 μC/g;
a ratio of the tribo-electrostatic charge to BET surface area of −3.5 μC/$m^2$ to +3.5 μC/$m^2$;
a methanol wettability of at least 20% by volume methanol in a methanol/water mixture; and
a ratio of carbon content to BET surface area of at most 0.020 wt. % × g/$m^2$.

2. The surface treated fumed silica of claim 1 wherein the surface treated fumed silica is a silica-based doped oxide, comprising at least 50% by weight of silicon dioxide.

3. The surface treated fumed silica of claim 1, wherein the BET surface area of the silica is 30 m2/g to 500 m2/g and the tribo-electrostatic charge is-200 to +50 uC/g.

4. The surface treated fumed silica of claim 1, obtained using a surface treatment agent selected from the group consisting of: organosilanes; silazanes; acyclic polysiloxanes; cyclic polysiloxanes; and mixtures thereof.

5. The surface treated fumed silica of claim 2, wherein numerical median particle size $d_{50}$ of the silica is less than 10 μm, as determined by static light scattering after 120 s of ultrasonic treatment at 25° C. of a 5% by weight dispersion of the silica in methanol.

6. The surface treated fumed silica of claim 1, wherein the carbon content of the silica is from 0.1% to 5% by weight and the tribo-electrostatic charge is −100 to 0 μC/g.

7. The surface treated fumed silica of claim 1, having a loss on drying of less than 0.4% by weight, as determined according to method A of ASTM D280-01.

8. The surface treated fumed silica of claim 1, having a tamped density of silica powder of not more than 250 g/L.

9. The surface treated fumed silica of claim 1, wherein the span $(d_{90}-d_{10})/d_{50}$ of particle size distribution of the silica is less than 3.0.

10. The surface treated fumed silica of claim 1, wherein the methanol wettability of the silica is 30%-70% by volume methanol in methanol/water mixture.

11. The surface treated fumed silica of claim 4, wherein numerical median particle size $d_{50}$ of the silica is less than 10 μm, as determined by static light scattering after 120 s of ultrasonic treatment at 25° C. of a 5% by weight dispersion of the silica in methanol.

12. The surface treated fumed silica of claim 11, wherein the carbon content of the silica is from 0.1% to 5% by weight.

13. The surface treated fumed silica of claim 12, having a loss on drying of less than 0.4% by weight, as determined according to method A of ASTM D280-01.

14. The surface treated fumed silica of claim 4, wherein the silica is a silica-based mixed oxide.

15. The surface treated fumed silica of claim 4, wherein the methanol wettability of the silica is 30%-70% by volume methanol in methanol/water mixture.

16. A composition comprising the silica of claim 1.

17. The composition of claim 16, wherein the composition is selected from the group consisting of: a toner; a paint; a coating; a silicone; a pharmaceutical or cosmetic preparation; an adhesive; or a sealant.

* * * * *